United States Patent
Okada et al.

(10) Patent No.: US 9,143,676 B2
(45) Date of Patent: Sep. 22, 2015

(54) IMAGING APPARATUS AND CONTROL METHOD FOR IMAGING APPARATUS FOR WARNING DISPLAY CONTROL OPERATION

(71) Applicant: CANON KABUSHIKI KAISHA, Tokyo (JP)

(72) Inventors: Koichi Okada, Kunitachi (JP); Soichiro Shigeeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 13/659,661

(22) Filed: Oct. 24, 2012

(65) Prior Publication Data
US 2013/0107100 A1    May 2, 2013

(30) Foreign Application Priority Data

Oct. 28, 2011    (JP) .................................. 2011-237764

(51) Int. Cl.
*H04N 5/222*    (2006.01)
*H04N 5/232*    (2006.01)

(52) U.S. Cl.
CPC ................................ *H04N 5/23216* (2013.01)

(58) Field of Classification Search
CPC ................................................. H04N 5/23293
USPC ............................................... 348/333.04
See application file for complete search history.

(56) References Cited

U.S. PATENT DOCUMENTS

| | | | |
|---|---|---|---|
| 7,432,972 B2* | 10/2008 | Lee et al. ................. | 348/333.02 |
| 2002/0054232 A1* | 5/2002 | Inagaki ........................ | 348/372 |
| 2004/0144328 A1* | 7/2004 | Bonner et al. ................ | 119/455 |
| 2004/0201764 A1* | 10/2004 | Honda et al. ............. | 348/333.01 |
| 2008/0106601 A1* | 5/2008 | Matsuda ........................ | 348/175 |

FOREIGN PATENT DOCUMENTS

JP    2005-236702 A    9/2005

* cited by examiner

*Primary Examiner* — Usman Khan
(74) *Attorney, Agent, or Firm* — Canon U.S.A., Inc. IP Division

(57) ABSTRACT

If a warning display about a matter of which warning is to be given has not yet been displayed when the matter occurring in an imaging apparatus has been detected, the imaging apparatus displays the warning display in response to detection of the matter, irrespective of whether a moving image is being recorded. If the warning display has already been displayed when the matter occurring in the imaging apparatus has been detected, the imaging apparatus does not display the warning display when the moving image is being recorded, and displays the warning display if the matter has still been detected when the moving image has stopped being recorded.

14 Claims, 10 Drawing Sheets

IMAGING APPARATUS AND CONTROL METHOD FOR IMAGING APPARATUS FOR WARNING DISPLAY CONTROL OPERATION

BACKGROUND OF THE INVENTION

1. Field of the Invention

The present invention relates to an imaging apparatus and a control method for the imaging apparatus. In particular, the present invention relates to a technique adapted to be used for a warning display control operation executed by an imaging apparatus.

2. Description of the Related Art

Imaging apparatuses such as digital video cameras are becoming increasingly advanced in the quality and the number of functions. Accordingly, there is an increased need for detecting apparatus abnormalities in various scenes. Generally, when an imaging apparatus detects an abnormality, the imaging apparatus notifies the user of the abnormality by displaying a warning on a display device such as a liquid crystal panel.

When the imaging apparatus detects an abnormality, the apparatus needs to display information to notify the user of a warning as soon as possible. In addition, when the apparatus detects an abnormality that prevents a normal apparatus operation or that causes damage to the apparatus, it is important that the user be continuously notified of the abnormality.

From these viewpoints, Japanese Patent Application Laid-Open No. 2005-236702 discusses a technique in which a warning display timing is controlled based on a point of variation in the apparatus operation. According to Japanese Patent Application Laid-Open No. 2005-236702, particular information is displayed at various timings, such as when the power supply is turned on/off, when the battery is changed, and when a mode is changed. In this way, the apparatus status can be accurately grasped and checked.

However, many imaging apparatuses use a single display device for displaying an image being captured and for notifying the user of an abnormality. Thus, in particular, if a warning is displayed during recording of an image, since the displayed warning obstructs the view of the user, the user finds the warning troublesome.

Therefore, a warning display technique that meets the following three demands is needed. First, when an abnormality is detected, a warning needs to be promptly displayed. Second, when an abnormality remains, the user needs to be continuously notified of a warning. Third, a warning needs to be displayed when an image is not being recorded.

SUMMARY OF THE INVENTION

The present invention is directed to an imaging apparatus capable of notifying a user of a warning about a continuing abnormality without fail while minimizing obstruction of imaging by the warning.

According to an aspect of the present invention, an imaging apparatus includes a recording unit configured to record a moving image captured by an imaging unit on a recording medium, a detection unit configured to detect a matter of which warning is to be given occurring in the imaging apparatus, a display unit configured to display the moving image captured by the imaging unit and a warning display indicating that the detection unit has detected the matter of which warning is to be given, and a control unit configured to control the display unit such that, if the display unit has not yet displayed the warning display about the matter of which warning is to be given when the detection unit has detected the matter of which warning is to be given occurring in the imaging apparatus, the control unit causes the display unit to display the warning display about the matter of which warning is to be given in response to detection of the matter of which warning is to be given, irrespective of whether the recording unit is recording the moving image, and, if the display unit has already displayed the warning display about the matter of which warning is to be given when the detection unit has detected the matter of which warning is to be given occurring in the imaging apparatus, the control unit causes the display unit not to display the warning display about the matter of which warning is to be given when the recording unit is recording the moving image, and causes the display unit to display the warning display about the matter of which warning is to be given if the detection unit has still detected the matter of which warning is to be given when the recording unit has stopped recording the moving image.

According to an exemplary embodiment of the present invention, it is possible to notify a user of a warning about a continuing abnormality without fail while minimizing obstruction of imaging by the warning.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
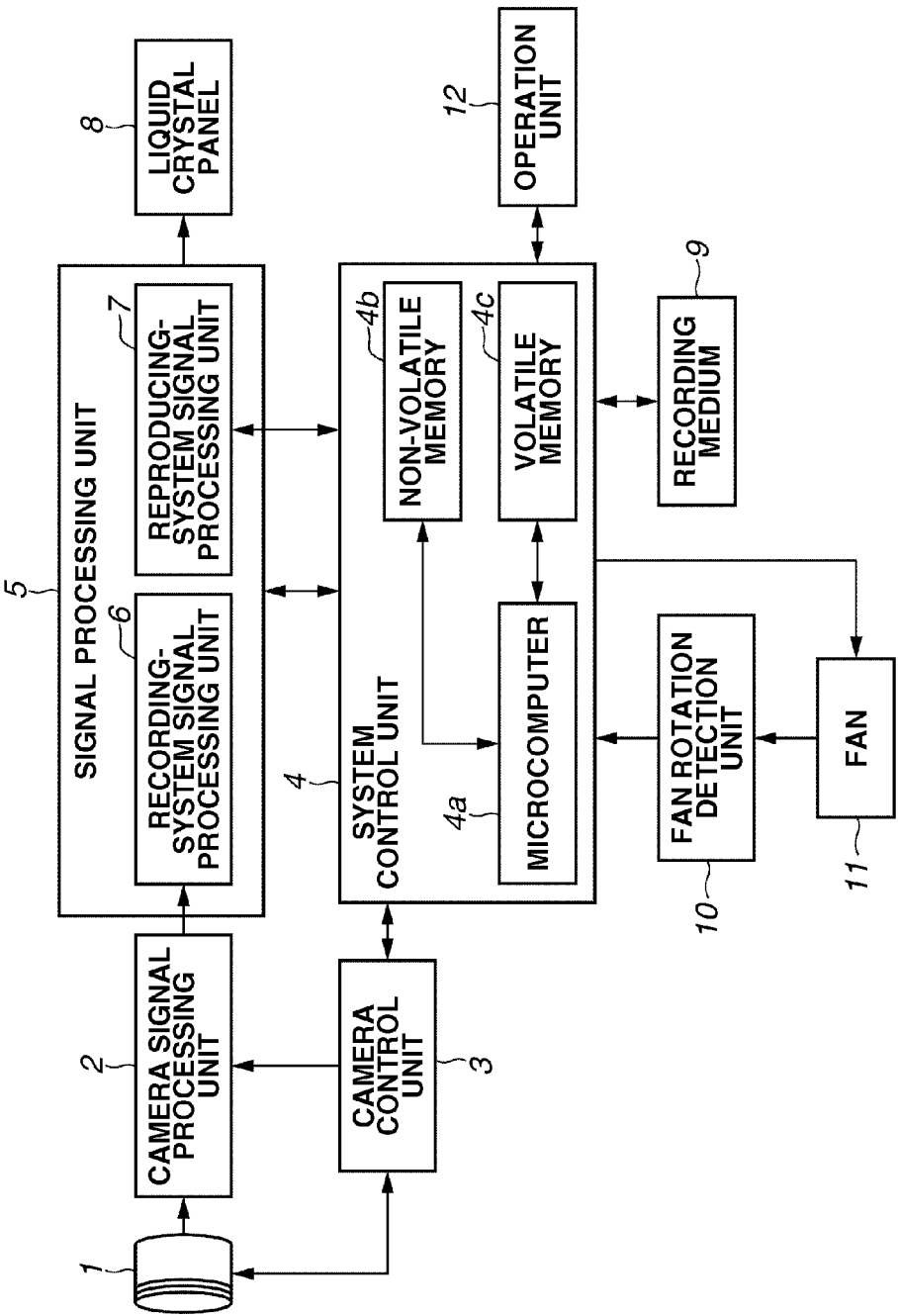
FIG. 1 is a block diagram illustrating a configuration of a digital video camera as an imaging apparatus according to a first exemplary embodiment.

FIG. 1 is a block diagram illustrating a configuration of a digital video camera as an imaging apparatus according to a first exemplary embodiment.

In FIG. 1, an imaging unit 1 includes an optical system lens, an image sensor such as a complementary metal-oxide semiconductor (CMOS) sensor, an automatic focus mechanism, and a zoom mechanism. The imaging unit 1 adjusts the focus, the light quantity, and the like with respect to the field of view, in accordance with instructions from a camera control unit 3. In addition, the imaging unit 1 converts an optical image in the field of view formed via the lens into a video signal and transmits the video signal to a camera signal processing unit 2. In accordance with instructions from the camera control unit 3, the camera signal processing unit 2 executes predetermined signal processing on the video signal supplied from the imaging unit 1 and transmits the processed video signal to a recording-system signal processing unit 6.

An operation unit 12 includes various switches and dials (AF on/off, AE auto/lock, program AE, etc.) related to the camera system. The operation unit 12 transmits instructions from an operator to the camera control unit 3 via a system control unit 4. The camera control unit 3 includes a microcomputer and controls the entire camera system in accordance with instructions from the system control unit 4, the operation unit 12, or the like.

A signal processing unit 5 includes the recording-system signal processing unit 6 and a reproducing-system signal processing unit 7. The signal processing unit 5 executes recording and reproducing signal processing in accordance with instructions from the system control unit 4. The recording-system signal processing unit 6 executes predetermined signal processing on a signal supplied from the camera signal processing unit 2, to generate a video signal. In addition, the recording-system signal processing unit 6 transmits this video signal to a recording medium 9 via the system control unit 4, so that the video signal is recorded on the recording medium 9.

For example, the recording medium 9 is a hard disk, a digital versatile disk (DVD), or a flash memory and stores video signals in accordance with instructions from the system control unit 4. These recorded video signals are read and reproduced in response to operation of the operation unit 12 and are displayed on a liquid crystal panel 8 via the system control unit 4 and the reproducing-system signal processing unit 7.

The system control unit 4 includes a microcomputer 4a comprehensively controlling the above various functions of the digital video camera, a non-volatile memory 4b storing control programs, and a volatile memory 4c capable of storing temporarily used data. The system control unit 4 configured in this way controls overall operations of the imaging apparatus.

The operation unit 12 includes various switches related to the VTR system and to the entire apparatus. In the first exemplary embodiment, the operation unit 12 includes switches corresponding to functions represented by [↑], [→], [↓], [←], [SET], [END], [PRINT], [MENU], [PLAY], [FF/REW], [STOP], and [START/STOP]). If an operator uses these switches and gives instructions, the instructions are transmitted to the system control unit 4. A power supply mode switch included in the operation unit 12 is used for selecting a power supply mode (camera/off/VTR) of the apparatus. The status of the power supply mode is transmitted to the system control unit 4.

The liquid crystal panel 8 displays a video signal processed by the signal processing unit 5. In addition, the liquid crystal panel 8 displays various types of information about the apparatus by using text or symbols. In addition, the liquid crystal panel 8 superimposes various screens on an image.

A fan 11 is a cooling device for reducing a rise in the temperature of the camera when the camera is heated by the imaging unit 1, for example. The system control unit 4 controls rotation of the fan 11. In addition, the fan 11 is connected to a fan rotation detection unit 10, which detects rotation of the fan 11 and outputs a pulse signal.

The system control unit 4 monitors the pulse signal supplied from the fan rotation detection unit 10. In the first exemplary embodiment, if detection of a pulse is not executed within a predetermined time or if an abnormality is found in the number of pulses per unit time, the system control unit 4 determines that there is an abnormality about the fan 11. If an abnormality is detected, the system control unit 4 displays a message indicating a warning in bitmap display on the liquid crystal panel 8.

In the first exemplary embodiment, when an abnormality of the fan 11 is detected, a first warning is displayed even during an image recording operation. However, subsequently, a warning is displayed when the image recording operation is stopped.

Figure 2:
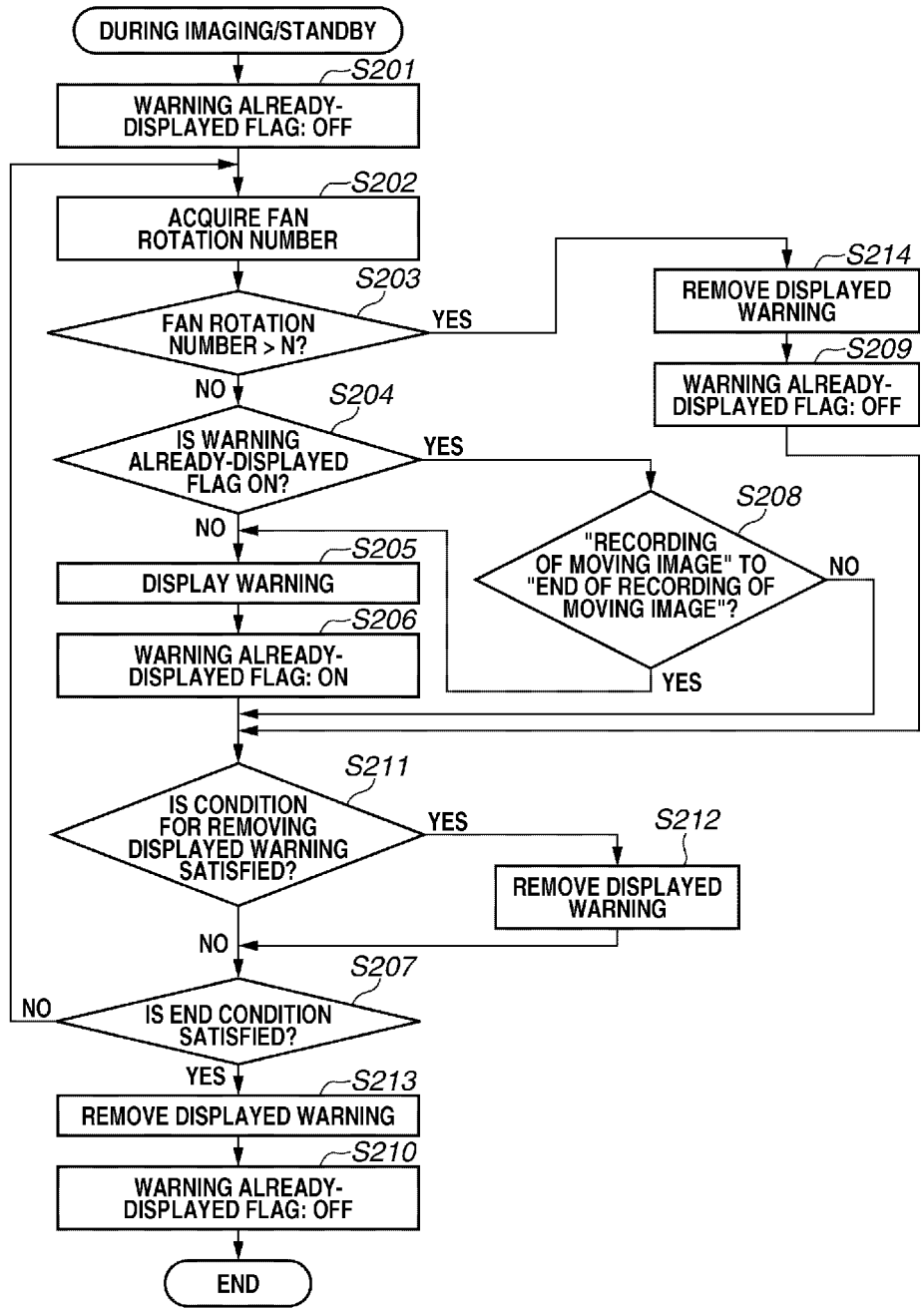
FIG. 2 is a flow chart illustrating an operation of the imaging apparatus according to the first exemplary embodiment.

FIG. 2 is a flow chart illustrating an operation according to the first exemplary embodiment. More specifically, FIG. 2 illustrates a flow of control processing in which the system control unit 4 detects a reduced fan rotation speed as an abnormality based on a signal from the fan rotation detection unit 10 and displays a warning. This processing is realized by loading a program stored in the non-volatile memory 4b onto the volatile memory 4c serving as a work memory and by causing the system control unit 4 to execute the program.

First, in step S201, the system control unit 4 initializes a warning already-displayed flag stored in the volatile memory 4c to OFF. The warning already-displayed flag is used to determine whether a warning that indicates an abnormality about the number of rotations of the fan 11 has ever been displayed.

Next, in step S202, the system control unit 4 acquires the fan rotation number within a predetermined time determined based on a pulse signal supplied from the fan rotation detection unit 10. Next, in step S203, the system control unit 4 compares the acquired fan rotation number with a predetermined threshold N, which is used to determine an abnormality. The threshold N is stored in the non-volatile memory 4b, and when the program is executed, the threshold N is read to the volatile memory 4c. In step S203, if the fan rotation number exceeds the threshold N (YES in step S203), the system control unit 4 determines that the fan 11 is operating normally. Thus, the system control unit 4 does not display a warning. On the other hand, in step S203, if the fan rotation number is equal to or less than the threshold N (NO in step S203), the system control unit 4 determines that there is an abnormality about the fan rotation number, and the operation proceeds to step S204.

In step S204, the system control unit 4 checks the warning already-displayed flag to determine whether a warning that indicates an abnormality about the fan rotation number has ever been displayed. In step S204, if the warning already-displayed flag is OFF (NO in step S204), the system control unit 4 determines that a warning has not yet been displayed, and the operation proceeds to step S205. In step S205, the system control unit 4 displays a warning. Next, in step S206, the system control unit 4 sets the warning already-displayed flag to ON, which indicates that a warning has been displayed.

On the other hand, in step S204, if the warning already-displayed flag is ON (YES in step S204), the system control unit 4 determines that a warning has already been displayed and that the abnormality has continuously been detected. Thus, the operation proceeds to step S208. In step S208, the system control unit 4 determines whether the image recording status of the digital video camera has been shifted from "RECORDING OF MOVING IMAGE" to "END OF RECORDING OF MOVING IMAGE." If so (YES in step S208), the operation proceeds to S205, in which the system control unit 4 displays a warning. Next, in step S206, the system control unit 4 sets the warning already-displayed flag to ON. However, if the operation proceeds to step S205 from step S208, the system control unit 4 can skip step S206. In step S208, if the image recording status has not been shifted (NO in step S208), namely, if recording of a moving image is continued or if recording of a moving image is not executed, the condition for displaying a warning is not satisfied. Thus, the operation proceeds to step S211.

In step S211, the system control unit 4 determines whether the user has executed an operation for hiding the displayed warning (for example, whether the user has pressed an OK button). If the user has executed such operation (YES in step S211), the operation proceeds to step S212, in which the system control unit 4 removes the displayed warning. Otherwise (NO in step S211), the operation proceeds to S207.

In step S207, the system control unit 4 determines whether a condition for ending this fan abnormality detection processing is satisfied. If the end condition is satisfied (YES in step S207), the operation proceeds to step S213, in which the system control unit 4 removes the displayed warning. Next, in step S210, the system control unit 4 resets the warning already-displayed flag to OFF and ends the present sequence.

In step S207, if the end condition is not satisfied (NO in step S207), since the system control unit 4 continues processing, the operation returns to step S202 from step S207. For example, in step S207, if the power supply of the digital video camera is turned off or if a camera mode for executing imaging is changed to a reproduction mode for reproducing a recorded image, the system control unit 4 determines that the end condition is satisfied. The imaging apparatus according to the present exemplary embodiment includes a plurality of operation modes, other than the camera mode and the reproduction mode.

On the other hand, in step S203, if the fan rotation number exceeds the threshold N (YES in step S203), the operation proceeds to step S214, in which the system control unit 4 removes the displayed warning. Next, in step S209, the system control unit 4 sets the warning already-displayed flag to OFF. By setting the warning already-displayed flag to OFF, when detecting an abnormality about the fan 11 again, the system control unit 4 can execute the above processing from the start.

Next, the process for detecting a warning in accordance with the control flow in FIG. 2 will be described with reference to FIGS. 3A, 3B, 3C, and 3D illustrating exemplary recording timings of the digital video camera.

Figure 3:
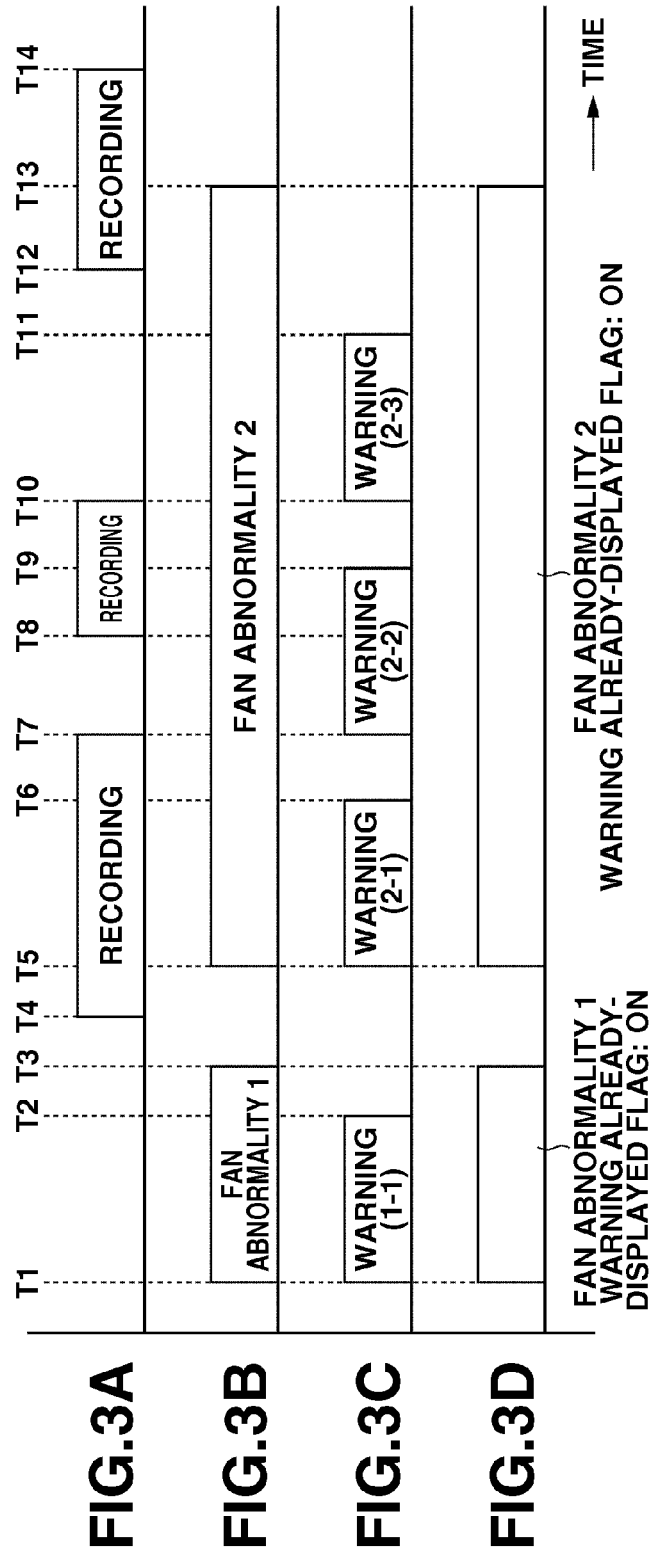
FIGS. 3A, 3B, 3C, and 3D are sequence diagrams illustrating an operation of the imaging apparatus according to the first exemplary embodiment.

FIGS. 3A, 3B, 3C, and 3D illustrate sequences over the horizontal axis that represents time. FIG. 3A illustrates a sequence that represents the recording status of the digital video camera, in which periods denoted by "RECORDING" represent when the digital video camera is recording images. Namely, no image is recorded in the other periods.

FIG. 3B illustrates a sequence that represents whether the fan has an abnormality over time. Periods denoted by "FAN ABNORMALITY" represent when the fan has an abnormality. Namely, the fan is operating normally in the other periods.

FIG. 3C illustrates a sequence that represents whether a warning is displayed over time. Periods denoted by "WARNING" represent when a warning is displayed on the liquid crystal panel 8. Namely, no warning is displayed in the other periods.

FIG. 3D illustrates a sequence that represents the status of the warning already-displayed flag for each fan abnormality. Each of the periods denoted by "WARNING ALREADY-DISPLAYED FLAG: ON" represents when a flag representing that a warning has been displayed is ON. Namely, the warning already-displayed flag is OFF in the other periods.

Figure 4:
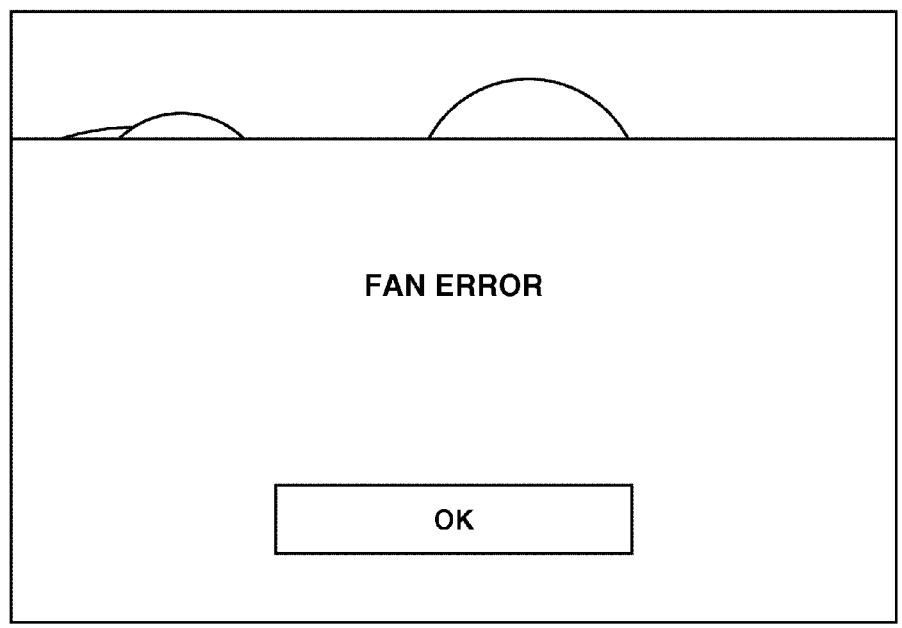
FIG. 4 illustrates a warning display according to the first exemplary embodiment.

As illustrated in FIG. 3B, abnormality 1 is detected at time T1. At time T1, as illustrated in FIG. 3A, the digital video camera is not recording any image. Since the warning already-displayed flag has not been set to ON prior to time T1, the system control unit 4 immediately displays a warning (1-1) as illustrated in FIG. 3C to notify the user of fan abnormality 1. A screen as illustrated in FIG. 4 is displayed as the warning. At time T2, the user removes the warning by using the operation unit 12.

In FIG. 4, a warning message for indicating a fan error and an OK button (software key) for deleting the warning are superimposed on an image being captured. Among the switches and buttons included in the operation unit 12, by pressing the one corresponding to the OK button (software key), the user can delete the warning in FIG. 4. When this warning is displayed, the warning already-displayed flag for fan abnormality 1 is temporarily set to ON. Next, at time T3, fan abnormality 1 is resolved, and the warning already-displayed flag is changed to OFF.

At time T5 in FIG. 3B, fan abnormality 2 is detected as illustrated in FIG. 3B. However, the digital video camera starts recording an image at time T4, as illustrated in FIG. 3A. Since the warning already-displayed flag is not ON yet, the system control unit 4 displays a warning (2-1) to notify the user of fan abnormality 2, as illustrated in FIG. 3C. Accordingly, the warning already-displayed flag for fan abnormality 2 is set to ON. Next, at time T6, while the user removes the warning, fan abnormality 2 still exists. Thus, when the user ends recording the image at time T7 as illustrated in FIG. 3A, the system control unit 4 displays a warning (2-2) for fan abnormality 2 for the second time at time T7.

Next, at time T8, the digital video camera starts recording an image, again. At time T9 the user removes the warning (2-2). However, after the digital video camera ends recording the image at time T10, the system control unit 4 displays a warning (2-3) for the third time. After the user removes the warning (2-3) at time T11, the warning already-displayed flag for fan abnormality 2 is maintained ON, as long as fan abnormality 2 exists. Subsequently, when fan abnormality 2 is resolved at time T13, the warning already-displayed flag is changed to OFF. The user starts and stops image recording at time T12 and time T14, respectively. Since the warning already-displayed flag is changed to OFF at time T13, no warning is displayed at time T14.

Subsequently, each time the next abnormality is detected, a similar operation is repeated as described above.

In the present exemplary embodiment, the displayed warning is removed by a user operation. However, the warning may be removed in another way. For example, the warning may be removed after a certain period of time elapses. In this way, similar effects can be obtained.

In addition, the present exemplary embodiment has been described based on an example where the camera captures a moving image. However, the present invention is also applicable to capturing of images other than moving images. For example, when an imaging operation is continuously executed for a certain period of time, if a warning is excessively displayed during the imaging operation, the imaging operation is obstructed. However, the present exemplary embodiment can solve such problem. More specifically, the present exemplary embodiment is applicable when still images are captured based on a continuous shooting operation or when a still image is captured based on a long-time exposure operation.

According to the present exemplary embodiment, when an abnormality about the imaging apparatus is first detected, irrespective of the recording status of the imaging apparatus, the user can be notified of the abnormality. Thus, the user can be warned quickly. In addition, once the user is notified of an abnormality, as long as the abnormality is continuously detected, the user can be continuously notified of the abnormality other than when an image is recorded. Namely, it is possible to notify a user of a warning about a continuing abnormality without fail while minimizing obstruction of imaging by the warning.

Next, a second exemplary embodiment will be described. In the second exemplary embodiment, the digital video camera has a similar system configuration as illustrated in FIG. 1 according to the first exemplary embodiment. However, according to the second exemplary embodiment, in addition to the first warning, a second warning is used. More specifically, after the first warning is removed, a second warning having a different display form is displayed, as long as a fan abnormality continuously exists. By displaying the second warning, the user can constantly be notified of a fan abnormality. For example, the second warning is displayed as an icon. Since the second warning occupies a smaller display area of the liquid crystal panel 8, the second warning is less noticeable than the first warning. However, the second warning is less obstructive when displayed.

Figure 5:
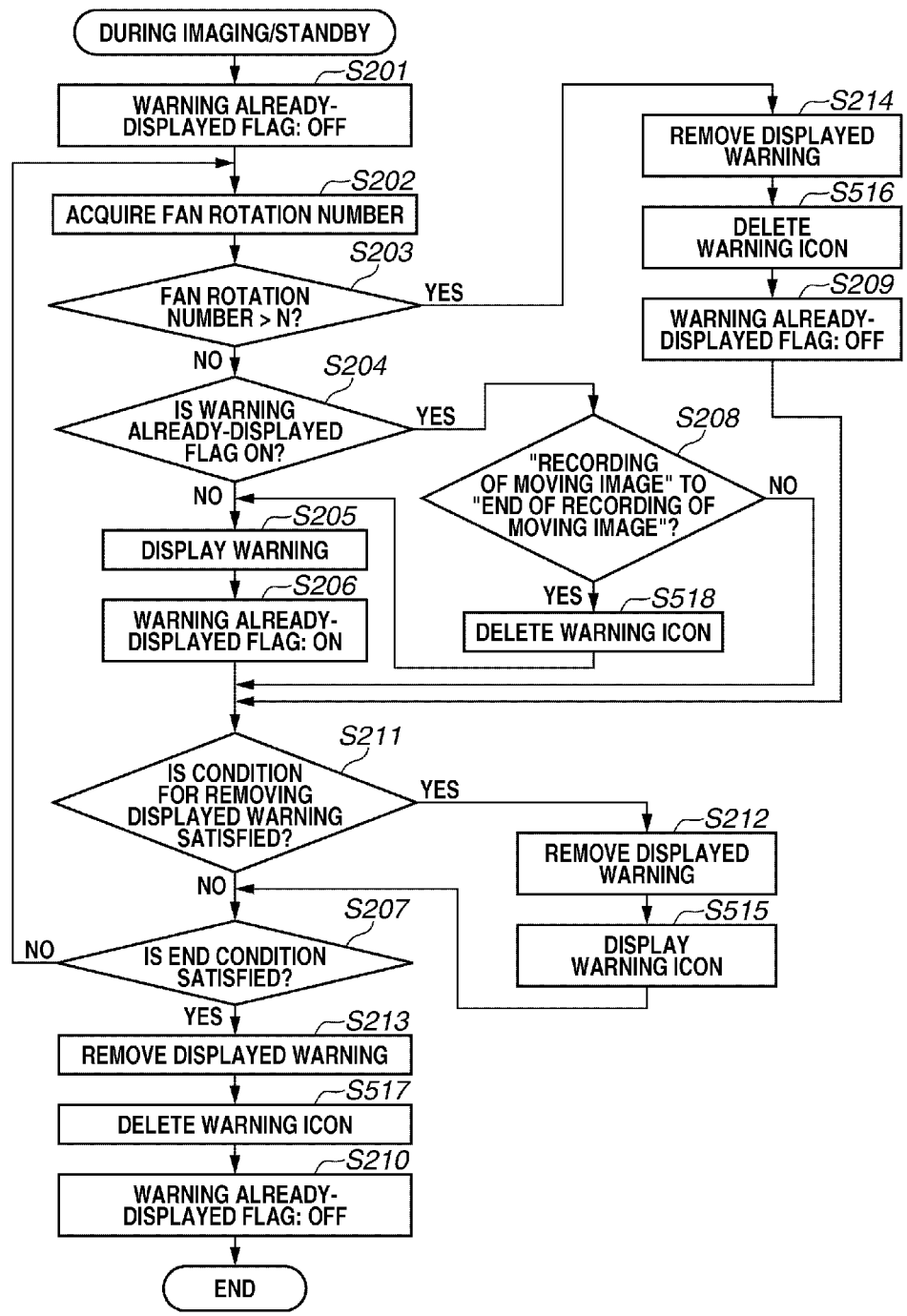
FIG. 5 is a flow chart illustrating an operation of an imaging apparatus according to a second exemplary embodiment.

FIG. 5 is a flow chart illustrating an operation according to the second exemplary embodiment. This processing is realized by loading a program stored in the non-volatile memory 4b onto the volatile memory 4c serving as a work memory and by causing the system control unit 4 to execute the program. Since steps S201 to S214 in FIG. 5 are similar to steps S201 to S214 in FIG. 2, detailed descriptions thereof are not repeated.

Figure 7:
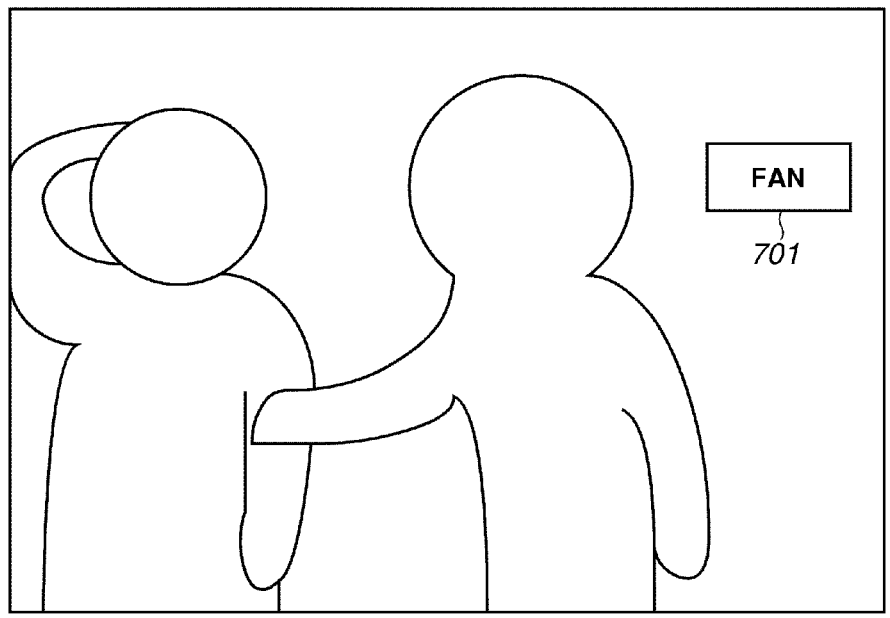
FIG. 7 illustrates a second warning display according to the second exemplary embodiment.

After a warning is displayed in step S205, if the condition for removing the displayed warning is satisfied (YES in step S211), the operation proceeds to step S212, in which the system control unit 4 removes the warning, as in the first exemplary embodiment. Next, in step S515, the system control unit 4 displays a warning icon as the second warning according to the present exemplary embodiment. An icon as illustrated in FIG. 7 is displayed as the warning icon. Since the icon is small, even when the digital video camera is recording an image, the icon does not obstruct the recording operation when being displayed.

Subsequently, the displayed warning icon is hidden at the following timings.

As the first timing, the system control unit 4 deletes the warning icon when the digital video camera records an image and ends the recording operation (YES in step S208). In this case, in step S518, the system control unit 4 deletes the warning icon, and in step S205, the system control unit 4 displays the first warning, again. As the second timing, the system control unit 4 deletes the warning icon in step S516, after the system control unit 4 determines that the fan rotation number is greater than the threshold N (YES in step S203) and the warning is removed in step S214. As the third timing, the system control unit 4 deletes the warning icon when the system control unit 4 determines that the end condition of the fan warning sequence is satisfied (YES in step S207). In this case, in step S213, the system control unit 4 removes the warning, and next, in step S517, the system control unit 4 deletes the warning icon.

Next, this process in accordance with the control flow in FIG. 5 will be described with reference to FIGS. 6A, 6B, 6C, 6D, and 6E.

Figure 6:
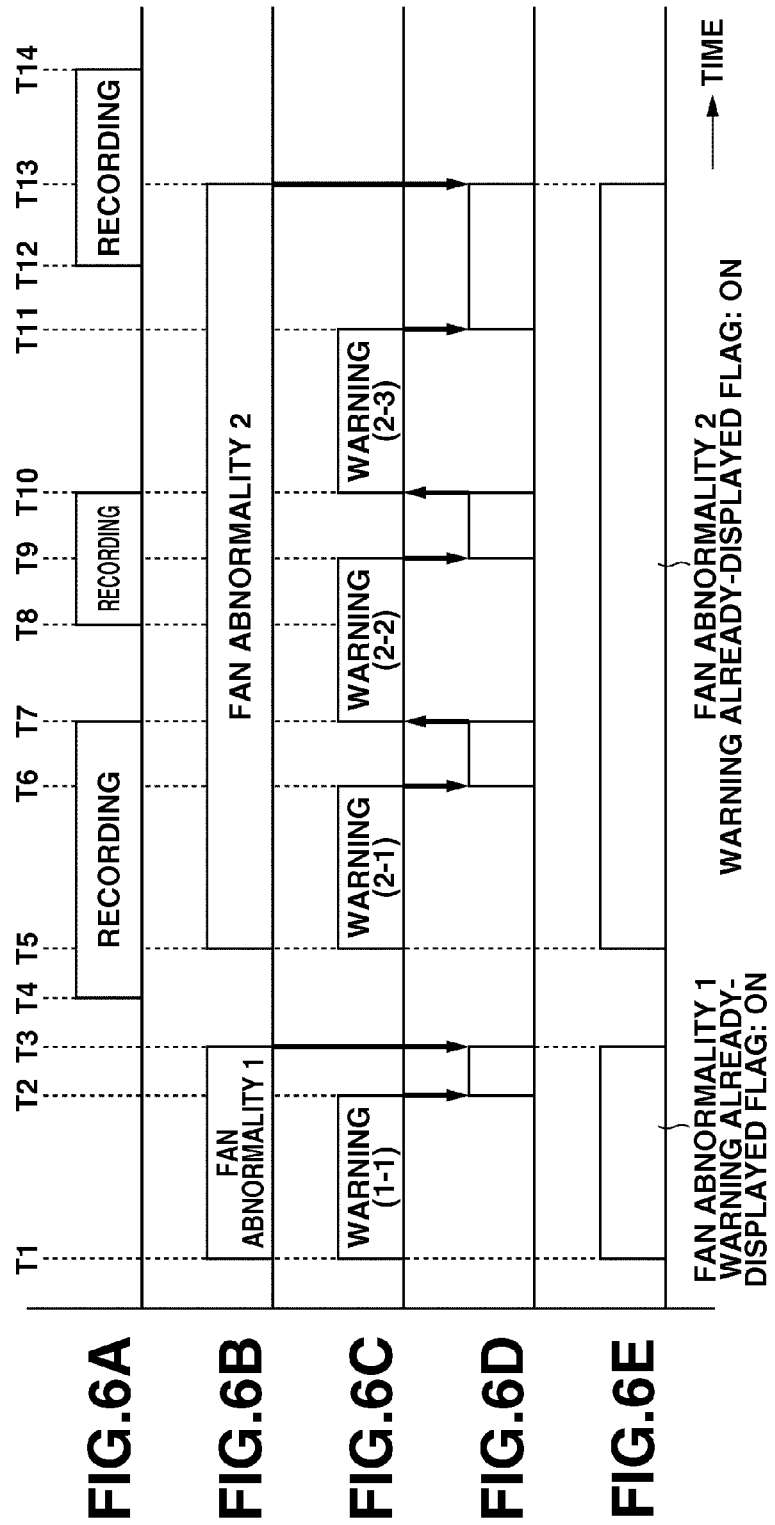
FIGS. 6A, 6B, 6C, 6D, and 6E are sequence diagrams illustrating an operation of the imaging apparatus according to the second exemplary embodiment.

FIGS. 6A, 6B, and 6C illustrate sequences similar to those illustrated in FIGS. 3A, 3B, and 3C. FIG. 6E illustrates a sequence similar to that illustrated in FIG. 3D. FIG. 6D illustrates a sequence that represents timing when the second warning is displayed.

As illustrated in FIG. 6C, at time T2, a warning (1-1) for fan abnormality 1 is removed. At the same time, as illustrated in FIG. 6D, a warning icon is displayed at time T2. Subsequently, when fan abnormality 1 is resolved at time T3, the warning icon is removed.

Next, at time T5, fan abnormality 2 occurs, and a warning (2-1) is displayed. Next, at time T6, the warning icon is displayed. Next, when a warning (2-2) is displayed at time T7, the warning icon is hidden. In this way, as long as fan abnormality 2 continuously exists, a warning icon as the second warning is displayed in the periods other than when the warnings (2-1) to (2-3) as the first warning are displayed. When fan abnormality 2 is resolved at timing T13, the warning icon is hidden.

In the present exemplary embodiment, a warning display method has been described by using an abnormality about the fan 11 as an example. However, the present exemplary embodiment is also applicable to other abnormalities. For example, the user can be notified of a warning about an abnormality of a power supply or the heat of the apparatus body.

In addition, in the present exemplary embodiment, the icon as the second warning is not displayed simultaneously with the first warning. However, the first and second warnings can constantly be displayed while a fan abnormality continuously exists. In this way, similar effects can be obtained.

A third exemplary embodiment will be hereinafter described based on an example where a warning is displayed when the voltage of a battery for supplying power to a digital video camera is decreased. The digital video camera according to the present exemplary embodiment is connectable to a compact power adapter (CA) as a power supply voltage, other than a battery. In addition, in the present exemplary embodiment, a warning is displayed, only when the battery is used as the power supply.

Figure 8:
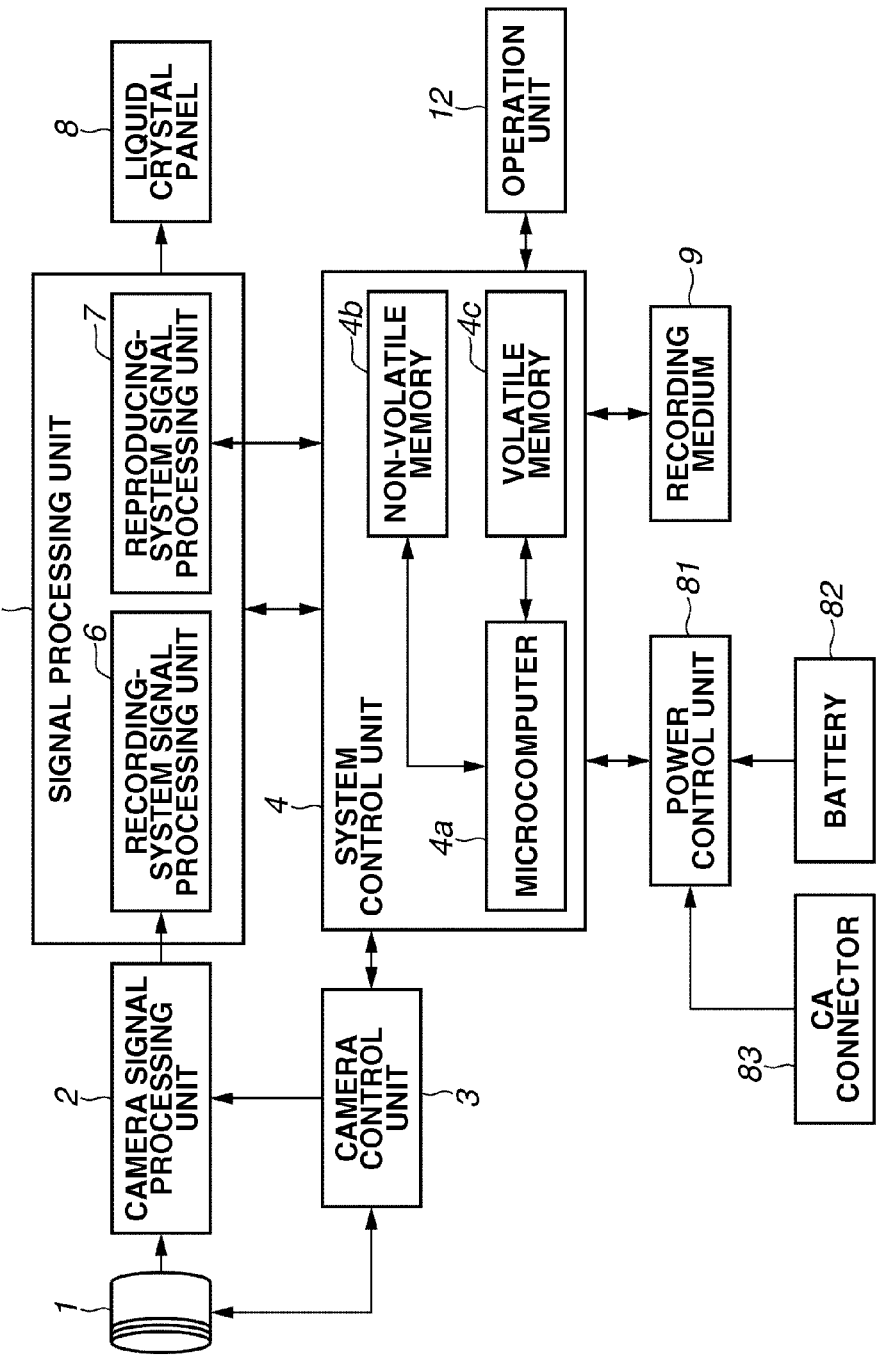
FIG. 8 is a block diagram illustrating a configuration of an imaging apparatus according to a third exemplary embodiment.

FIG. 8 illustrates a system configuration of the digital video camera according to the present exemplary embodiment. Since the units 1 to 9 and 12 in FIG. 8 are similar to those in FIG. 1, detailed descriptions thereof are not repeated.

In FIG. 8, a power control unit 81 is a function block executing power-supply-related control operations. More specifically, the power control unit 81 controls supply of power to an integrated circuit (IC) used in each block of the digital video camera, in accordance with instructions from the system control unit 4.

A battery 82 is detachable from the apparatus body. A CA connector 83 serves as a connection port for a CA adapter when the CA supplies power to the digital video camera. When a CA is connected to the CA connector 83, power is supplied only from the CA, not from the battery 82. On the other hand, if a CA is not connected, power is supplied only from the battery 82. This exclusive control operation is executed by the power control unit 81. In addition, the power control unit 81 monitors the voltage of the power supplied from the battery or the CA serving as a main power supply and notifies the system control unit 4 of the voltage.

Figure 9:
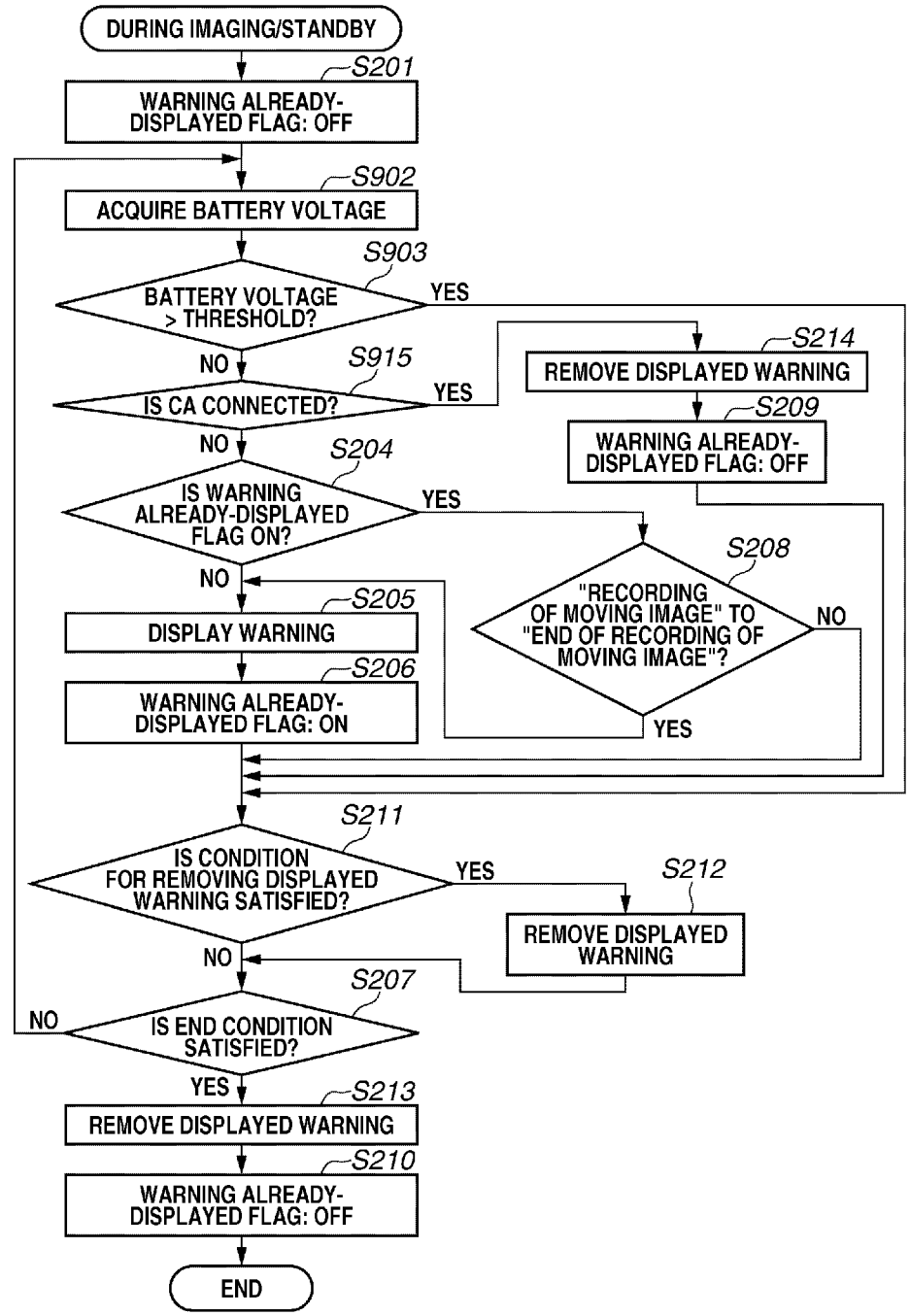
FIG. 9 is a flow chart illustrating an operation of the imaging apparatus according to the third exemplary embodiment.

FIG. 9 is a flow chart illustrating an operation of the imaging apparatus according to the present exemplary embodiment. This processing is realized by loading a program stored in the non-volatile memory 4b onto the volatile memory 4c serving as a work memory and by causing the system control unit 4 to execute the program. In FIG. 9, since step S201 and steps S205 to S214 correspond to step S201 and steps S205 to S214 in FIG. 2, detailed descriptions thereof are not repeated. The following processing is executed by causing the system control unit 4 to control various units of the imaging apparatus.

In FIG. 9, first, in step S201, the system control unit 4 sets the warning already-displayed flag to OFF. Next, in step S902, the system control unit 4 acquires the voltage of the battery 82 from the power control unit 81. Next, in step S903, the system control unit 4 compares the acquired battery voltage with a predetermined threshold, which is used to determine whether the voltage indicates an abnormality. In step S903, if the battery voltage exceeds the threshold (YES in step S903), the system control unit 4 determines that the voltage is normal and does not display a warning.

On the other hand, in step S903, if the power supply voltage is less than or equal to the threshold (NO in step S903), the system control unit 4 determines that the voltage of the battery 82 indicates an abnormality, and the operation proceeds to step S915. In step S915, the system control unit 4 determines whether a CA is connected. If a CA is connected (YES in step S915), the system control unit 4 does not display a warning. If a warning has already been displayed, the operation proceeds to step S214, in which the warning is removed.

Figure 10:
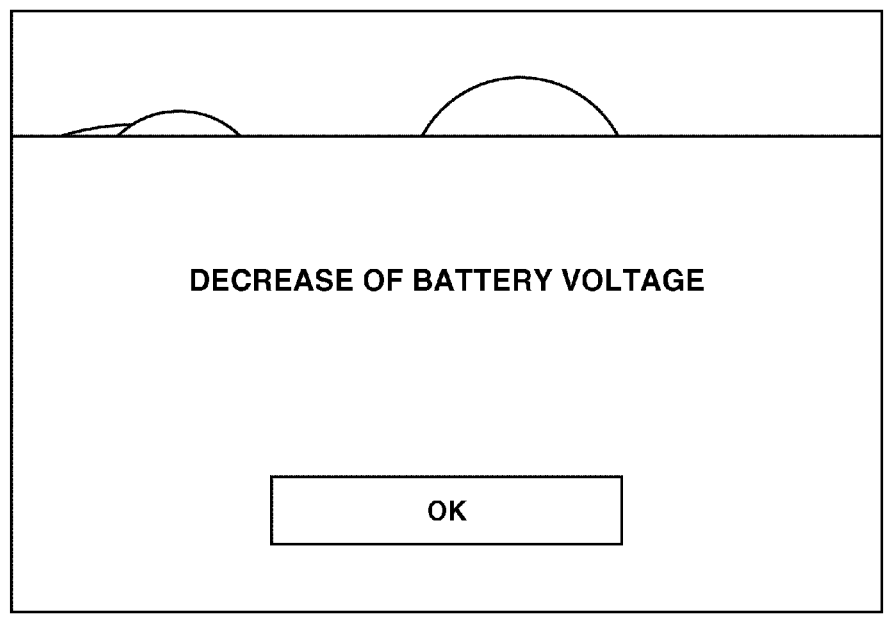
FIG. 10 illustrates a third warning display according to the third exemplary embodiment.

In step S915, if no CA is connected (NO in step S915), the operation proceeds to step S204, in which the system control unit determines whether to display a warning. The subsequent warning display process is similar to that in the first exemplary embodiment. In step S204, if the warning already-displayed flag is not ON (NO in step S204), the operation proceeds to step S205, in which the system control unit 4 displays a warning. On the other hand, in step S204, if the warning already-displayed flag is ON (YES in step S204), the operation proceeds to step S208. In step S208, the system control unit 4 determines whether the recording status of the imaging apparatus has been shifted from "RECORDING OF MOVING IMAGE" to "END OF RECORDING OF MOVING IMAGE." FIG. 10 illustrates a warning displayed in the present exemplary embodiment.

After the system control unit 4 determines that the battery voltage is less than the threshold in step S903 of the last loop (namely, a warning has already been displayed), if the system control unit 4 determines that the battery voltage exceeds the threshold in step S903 of the ongoing loop, the warning is continuously displayed and the operation proceeds to step S211. In this way, flickering of a warning is prevented. Next, in step S211, if the condition for removing the warning is satisfied (YES in step S211), even if the battery voltage exceeds the threshold, the system control unit 4 removes the warning.

If a warning has already been displayed and if the system control unit 4 determines that a CA is connected (YES in step S915), the system control unit 4 determines that the abnormality is resolved. Thus, the operation proceeds to step S214 and the system control unit 4 removes the warning. Next, in step S209, the system control unit 4 changes the warning already-displayed flag to OFF.

The control operations by the system control unit 4 can be executed by a single hardware component. Alternatively, the control operations can be shared by a plurality of hardware components, to control the entire apparatus.

In addition, the above exemplary embodiments have been described based on examples where the present invention is applied to a video camera. However, the present invention is not limited to such examples. The present invention is applicable to an imaging apparatus that includes a display unit such as the liquid crystal panel 8 and that is capable of continuously executing an imaging operation for a certain period of time. For example, the present invention is applicable to an imaging apparatus capable of capturing still images based on a continuous shooting operation or capturing a still image based on a long-time exposure operation or a bulb exposure operation. Namely, for example, the imaging apparatus according to an exemplary embodiment of the present invention is applicable to a camera-equipped personal computer or personal digital assistant (PDA), a camera-equipped mobile phone terminal or mobile image viewer, a printer apparatus including a camera-equipped display, a camera-equipped music player, a camera-equipped game machine, and a camera-equipped electronic book reader.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-237764 filed Oct. 28, 2011, which is hereby incorporated by reference herein in its entirety.

What is claimed is:

1. An imaging apparatus comprising: at least one central processor that reads out and executes a program recorded on a non-transitory memory, the at least one central processor being programmed to control:

a recording unit configured to record a moving image captured by an imaging unit on a recording medium;

a detection unit configured to detect a matter of which warning is to be given occurring in the imaging apparatus;

a display unit configured to display the moving image captured by the imaging unit and a warning display indicating that the detection unit has detected the matter of which warning is to be given; and a control unit configured to control the display unit such that, if the display unit has not yet displayed the warning display about the matter of which warning is to be given when the detection unit has detected the matter of which warning is to be given occurring in the imaging apparatus, the control unit causes the display unit to display the warning display about the matter of which warning is to be given in response to detection of the matter of which warning is to be given, irrespective of whether the recording unit is recording the moving image, and, if the display unit has already displayed the warning display about the matter of which warning is to be given when the detection unit has detected the matter of which warning is to be given occurring in the imaging apparatus, the control unit causes the display unit not to display the warning display about the matter of which warning is to be given when the recording unit is recording the moving image, and causes the display unit to display the warning display about the matter of which warning is to be given if the detection unit has still detected the matter of which warning is to be given when the recording unit has stopped recording the moving image, wherein the control unit controls the display unit such that, if the matter of which warning is to be given occurs when the recording unit is recording the moving image and the matter has still existed when the recording unit has stopped recording the moving image, the control unit causes the display unit to display the warning display once during the recording unit is recording the moving image and to display the warning display again in response to stopping of the recording, wherein the control unit controls the display unit to display the warning display every time recording is stopped when the matter has still existed and stop the display unit from displaying the warning display only when the matter no longer exists, and wherein the matter of which warning is to be given occurring in the imaging apparatus is a reduction in a fan rotation speed detected by the detection unit by analyzing a number of rotations of the fan and comparing the number of rotations of the fan with a predetermined threshold.

2. The imaging apparatus according to claim 1, wherein the at least one central processor is further programmed to control a storage control unit configured to store, if the display unit has displayed the warning display about the matter of which warning is to be given, information indicating that the warning display about the matter of which warning is to be given has been displayed in a storage medium; and a determination unit configured to determine, if the detection unit has detected the matter of which warning is to be given occurring in the imaging apparatus, whether the display unit has already displayed the warning display about the matter of which warning is to be given, based on the information stored in the storage medium.

3. The imaging apparatus according to claim 2, wherein, when the matter of which warning is to be given occurring in the imaging apparatus is resolved, the storage control unit clears the information, stored in the storage medium, indicating that the warning display about the matter of which warning is to be given has been displayed.

4. The imaging apparatus according to claim 2, wherein, if a plurality of operation modes exists, when an operation mode is changed to another operation mode, the storage control unit clears the information, stored in the storage medium, indicating that the warning display about the matter of which warning is to be given has been displayed.

5. The imaging apparatus according to claim 1, wherein the control unit causes the display unit to hide the warning display in response to an operation from a user.

6. The imaging apparatus according to claim 1, wherein the control unit causes the display unit to hide the warning display when a predetermined period of time elapses after the warning display starts to be displayed.

7. The imaging apparatus according to claim 1, wherein the warning display includes a text message representing the matter of which warning is to be given.

8. The imaging apparatus according to claim 1, wherein the control unit causes the display unit to superimpose the warning display on a captured moving image displayed by the display unit.

9. The imaging apparatus according to claim 1, wherein, if the display unit has already displayed the warning display about the matter of which warning is to be given when the detection unit has detected the matter of which warning is to be given occurring in the imaging apparatus, the control unit causes the display unit to display a warning icon different from the warning display, without displaying the warning display about the matter of which warning is to be given, when the recording unit is recording the moving image.

10. The imaging apparatus according to claim 1, wherein the at least one central processor is further programmed to control the fan configured to cool an inside of the imaging apparatus, wherein the detection unit detects an abnormality about rotation of the fan, and wherein the warning display indicates the abnormality about rotation of the fan.

11. The imaging apparatus according to claim 1, wherein the detection unit detects a matter of which warning is given about a battery for supply of power, and wherein the warning display indicates the matter of which warning is given about the battery.

12. The imaging apparatus according to claim 11, wherein the at least one central processor is further programmed to control a connection unit configured to be connectable to a power supply different from the battery, wherein, if the different power supply is connected to the connection unit even when the matter of which warning is given about the battery is occurring, the control unit causes the display unit not to display the warning display.

13. A method for controlling an imaging apparatus, the method comprising:

recording a moving image captured by an imaging unit on a recording medium;

detecting a matter of which warning is to be given occurring in the imaging apparatus;

causing, if a warning display about the matter of which warning is to be given has not yet been displayed when the matter of which warning is to be given occurring in the imaging apparatus has been detected, a display unit to display the warning display about the matter of which warning is to be given in response to detection of the matter of which warning is to be given, irrespective of whether the moving image is being recorded; and causing, if the warning display about the matter of which warning is to be given has already been displayed when the matter of which warning is to be given occurring in the imaging apparatus has been detected, the display unit not to display the warning display about the matter of which warning is to be given when the moving image is being recorded, and causing the display unit to display the warning display about the matter of which warning is to be given if the matter of which warning is to be given has still been detected when the moving image has stopped being recorded, wherein, if the matter of which warning is to be given occurs when the recording step is recording the moving image and the matter has still existed when the recording step has stopped recording the moving image, the causing step causes the display unit to display the warning display once during the recording step is recording the moving image and to display the warning display again in response to stopping of the recording, wherein the control unit controls the display unit to display the warning display every time recording is stopped when the matter has still existed and stop the display unit from displaying the warning display only when the matter no longer exists, and wherein the matter of which warning is to be given occurring in the imaging apparatus is a reduction in a fan rotation speed detected by the detecting step by analyzing a number of rotations of the fan and comparing the number of rotations of the fan with a predetermined threshold.

14. A non-transitory computer-readable storage medium storing a program that causes a computer to execute a method comprising:

recording a moving image captured by an imaging unit on a recording medium;

detecting a matter of which warning is to be given occurring in an imaging apparatus;

causing, if a warning display about the matter of which warning is to be given has not yet been displayed when the matter of which warning is to be given occurring in the imaging apparatus has been detected, a display unit to display the warning display about the matter of which warning is to be given in response to detection of the matter of which warning is to be given, irrespective of whether the moving image is being recorded; and causing, if the warning display about the matter of which warning is to be given has already been displayed when the matter of which warning is to be given occurring in the imaging apparatus has been detected, the display unit not to display the warning display about the matter of which warning is to be given when the moving image is being recorded, and causing the display unit to display the warning display about the matter of which warning is to be given if the matter of which warning is to be given has still been detected when the moving image has stopped being recorded, wherein, if the matter of which warning is to be given occurs when the recording step is recording the moving image and the matter has still existed when the recording step has stopped recording the moving image, the causing step causes the display unit to display the warning display once during the recording step is recording the moving image and to display the warning display again in response to stopping of the recording, wherein the control unit controls the display unit to display the warning display every time recording is stopped when the matter has still existed and stop the display unit from displaying the warning display only when the matter no longer exists, and wherein the matter of which warning is to be given occurring in the imaging apparatus is a reduction in a fan rotation speed detected by the detecting step by analyzing a number of rotations of the fan and comparing the number of rotations of the fan with a predetermined threshold.

* * * * *